(No Model.)
S. A. JOHANSSON.
CURRYING AND BRUSHING MACHINE.
No. 474,325. Patented May 3, 1892.
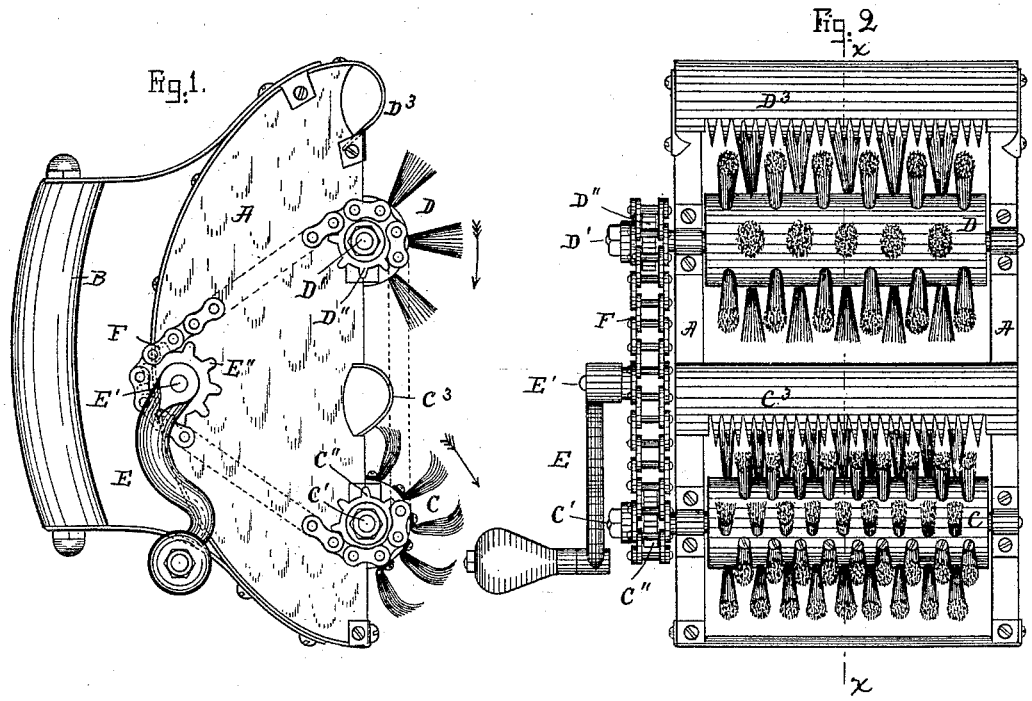
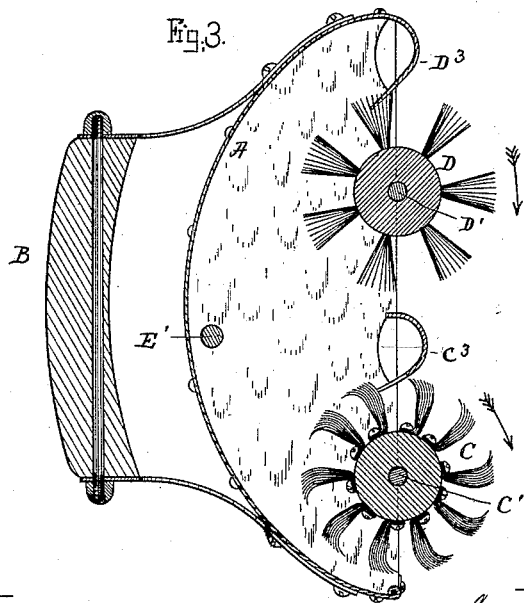
Witnesses.
Inventor.
Samuel A. Johansson

UNITED STATES PATENT OFFICE.

SAMUEL A. JOHANSSON, OF EVERETT, MASSACHUSETTS, ASSIGNOR OF ONE-HALF TO ALEXANDER SANDBERG AND JOHN SANDBERG, OF SAME PLACE.

CURRYING AND BRUSHING MACHINE.

SPECIFICATION forming part of Letters Patent No. 474,325, dated May 3, 1892.

Application filed October 17, 1891. Serial No. 409,036. (No model.)

*To all whom it may concern:*

Be it known that I, SAMUEL A. JOHANSSON, a citizen of Sweden, and a resident of Everett, in the county of Middlesex and State of Massachusetts, have invented new and useful Improvements in Currying and Brushing Machines for Animals, of which the following, taken in connection with the accompanying drawings, is a specification.

This invention relates to improvements in machines for currying and brushing horses and other animals in a quick and effective manner, and it is carried out as follows, reference being had to the accompanying drawings, wherein—

Figure 1 represents a side elevation, and Fig. 2 a bottom plan view, of the invention. Fig. 3 represents a longitudinal section on the line X X shown in Fig. 2.

Similar letters refer to similar parts wherever they occur on the different parts of the drawings.

The invention consists of a box or frame A, provided with a handle B, rigidly connected with the box or frame for guiding it during the currying and brushing operation. The said box or frame A is open on its under side and there provided with a pair of rotary brushes C and D, the hubs of which are mounted on the respective shafts $C'$ $D'$, journaled in bearings in the sides of the box or frame A, as shown. The brushes C D are set in a rotary motion in the direction of the arrows shown in Figs. 1 and 3 by means of a crank E, secured to a drive-shaft $E'$, journaled in the sides of the box or frame and arranged in a plane parallel with the brush-shafts $C'$ and $D'$. The drive-shaft is connected with the brush-shafts through the medium of an endless chain belt F, and for this purpose the brush-shafts are provided, respectively, with sprocket-wheels $C''$ $D''$, and the drive-shaft is provided with a sprocket-wheel $E''$ in such manner that by turning the crank-handle E the brush-shafts are caused to revolve in the same direction, as indicated by the arrows.

The rotary brush C is the currying-brush, and its bristles are preferably made of metal wire, slightly bent or curved, as shown, so as not to injure the flesh of the animal during the currying process. The rotary brush D is the cleaning or dust brush, preferably made of pig's bristle or other suitable material for the purpose of removing from and between the hair of the animal the dust and impurities raised by the rotary currying-brush C.

In front of the brushes C and D are secured, respectively, the toothed or notched comb-plates $C^3$ and $D^3$, against which the bristles of the said rotary brushes are brought in contact during the rotation of said brushes for the purpose of cleaning them and removing dust and impurities from and between their bristles.

In using the machine the operator takes hold of the handle B with one hand and holds and guides the brushes with more or less pressure against the hide of the animal. With his other hand he turns the crank E, causing the brushes C D to be quickly rotated, thus currying and cleansing or brushing the animal at one and the same operation.

The machine is very simple in construction and mode of operation, and by its use an animal may be more quickly and effectually curried and brushed as compared with the ordinary method of currying and brushing by two independent tools.

If so desired, the rollers C D may be rotated by power and a flexible shaft, similar to the mode of operating clipping or dental machinery, without departing from the essence of my invention.

Having thus fully described the nature, construction, and operation of my invention, I wish to secure by Letters Patent and claim—

The combination, in a machine for currying and brushing animals, of a box or frame A, open at its lower side and provided with the toothed plates $C^3$ $D^3$, a pair of brush-shafts $C'$ $D'$, journaled to the box or frame, having brushes which act against the toothed plates and provided, respectively, with sprocket-wheels $C''$ $D''$, a drive-shaft $E'$, journaled in the box or frame, extending in a plane parallel with the brush-shafts and provided with a sprocket-wheel $E''$ and a crank-handle E, an endless chain belt F, engaging the sprocket-wheels of the brush and drive-shafts, and a handle B, rigidly connected with the box or frame for guiding the apparatus while in use, substantially as described.

In testimony whereof I have signed my name to this specification, in the presence of two subscribing witnesses, on this 13th day of October, A. D. 1891.

SAMUEL A. JOHANSSON.

Witnesses:
ALBAN ANDRÉN,
JOSEPH F. HAWKINS.